United States Patent [19]
Adams et al.

[11] 4,005,929
[45] Feb. 1, 1977

[54] REFLECTIVE IMAGING MEMBER

[75] Inventors: James E. Adams, Ontario; Werner E. L. Haas, Webster, both of N.Y.

[73] Assignee: Xerox Corporation, Stamford, Conn.

[22] Filed: Apr. 28, 1975

[21] Appl. No.: 572,373

[52] U.S. Cl. .................. 350/160 LC; 350/96 BC
[51] Int. Cl.² ............................................ G02F 1/13
[58] Field of Search ............... 350/96 BC, 160 LC

[56] References Cited
UNITED STATES PATENTS 3,891,309  6/1975  Bonne ..................... 350/160 R Primary Examiner—Edward S. Bauer
Attorney, Agent, or Firm—James J. Ralabate; Michael H. Shanahan; George J. Cannon

[57] ABSTRACT

An imaging member to be viewed in reflection comprises a front surface reflection rejection layer on one side of an imaging layer and a reflection layer on the other side of the imaging layer, the reflection rejection layer comprising one or more rectangular blocks of transparent material having a height, H, and a base, L, characterized by the relationship $H = 3/2\ L\ \text{TAN}\ \theta' + 2\ n\ L\ \text{TAN}\ \theta'$, where $\theta'$ is the angle of refraction of readout radiation into said transparent material and $n$ is selected from the group consisting of zero and positive integers.

15 Claims, 4 Drawing Figures

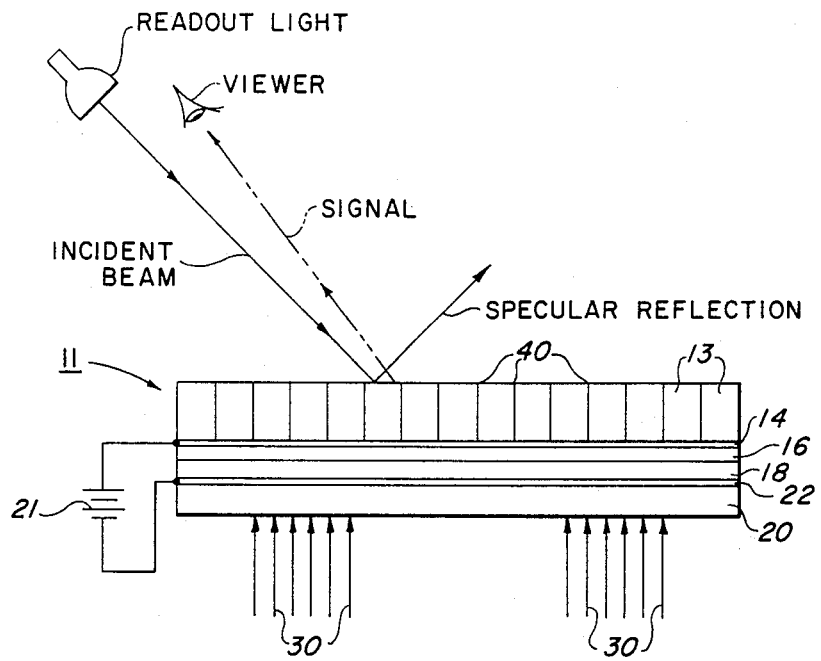
FIG. 1
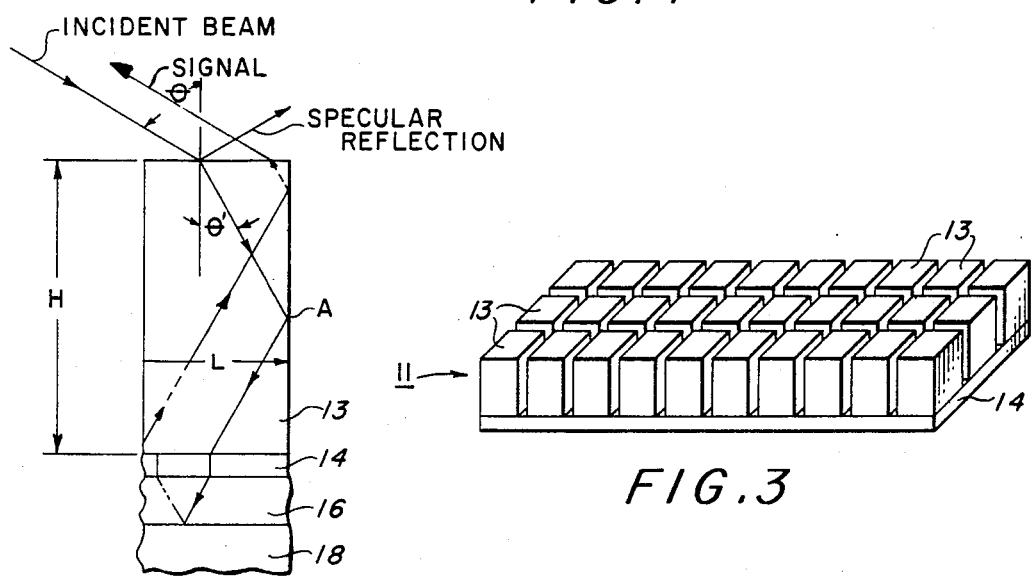
FIG. 2
FIG. 3
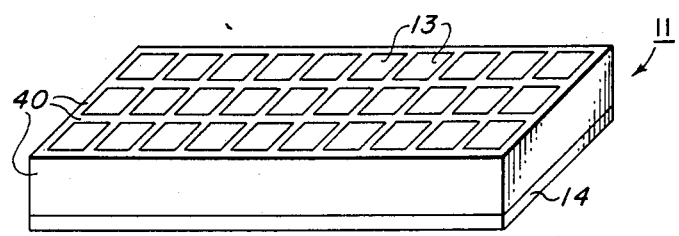
FIG. 4

REFLECTIVE IMAGING MEMBER

BACKGROUND OF THE INVENTION

This invention relates generally to an imaging member viewed in reflection and more particularly to such an imaging member comprising a front surface reflection rejection layer.

There are known in the art many different types of imaging and display systems including, for example, electrophoretic, electroluminescent, photoelectrophoretic, ferroelectric, and liquid crystal. In such systems it is known to form images by the application of various stimuli to the imaging materials. In one preferred embodiment a layer of imaging material is arranged adjacent a substantially transparent electrode and images are formed by steps including applying an electrical field across the imaging layer. In a well known embodiment a layer of imaging material is arranged between a pair of planar full frame electrodes one of which may include a photoconductive insulating layer. In many instances the images formed in these types of imaging and display members are made up of areas which scatter light and those which do not scatter light. Depending, inter alia, upon the particular electrode system the images may be read out in transmission or reflection. Moreover, the images may typically be viewed directly by an observer or may be used in other ways such as, for example, where the image is projected onto means adapted to make a hard copy reproduction thereof.

Imaging and display members of this type are capable of providing excellent images; however, some difficultly may be encountered in reading out the images which may adversely affect device performance. For example, when the reflection readout mode is utilized the contrast of an image perceived by a viewer is typically limited by spurious front surface reflections. Such limitations may in some instances render direct readout virtually impossible and may dictate the use of image enhancement means such as polarizers which has heretofore been the case with some liquid crystal imaging members. The polarizers typically exploit the birefringence of the liquid crystal materials and typically provide greatly increased contrast. However, the necessity of employing polarizers to read out the image is not a completely satisfactory expedient because, inter alia, they typically require off-axis optics and thus complicate the imaging system. Additionally, polarizers generally cause relatively large light losses which is undesirable. It would be highly desirable to minimize any loss in image contrast caused by light reflections when an imaging or display member is read out in reflection.

SUMMARY OF THE INVENTION

It is therefore an object of this invention to provide the above-described desirable features.

Another object is to provide novel imaging members.

Still another object is to provide imaging members wherein there may be formed images comprising differences in the light scattering and/or light absorbing properties of the imaging material.

Still further it is an object to provide novel imaging members which include a photoconductive insulating layer.

Still another object is to provide novel liquid crystal imaging members.

A further object is to provide liquid crystal imaging members comprising a layer of liquid crystalline material havng helical molecular orientation.

Another object is to provide liquid crystal imaging members comprising a layer of nematic liquid crystalline material.

Still another object is to provide liquid crystal imaging members comprising a layer of smectic liquid crystalline material.

Still further it is an object to provide imaging members comprising an imaging layer, a front surface reflection rejection layer on one side of the imaging layer and a reflection layer on the other side of the imaging layer wherein when viewed in reflection, spurious front surface reflections are separated from light reflected through the imaging layer.

BRIEF SUMMARY OF THE INVENTION

These and other objects and advantages are accomplished in accordance with the present invention by providing an imaging member including a layer of an imaging material and a reflective layer or interface rejection layer on the other side of the imaging layer; the rejection layer comprising one or more rectangular blocks of transparent material, the rectangular blocks having a height, H, and a base, L, and characterized by the relationship $H = 3/2\ L\ \text{TAN}\ \theta' + 2\ n\ L\ \text{TAN}\ \theta'$, where $\theta'$ is the angle of refraction of readout light and $n$ is zero or any positive integer. $\theta'$ is related to the angle of incidence $\theta$ of readout light through Snell's law.

The imaging layer may comprise any material the light scattering and/or the light absorption properties of which may be changed in imagewise configuration. By the term "light scattering" is meant any phenomenon involving the annihilation and creation of photons in approximately equal numbers. This definition is intended to include, for example, specular reflection, phenomena involving wavelength conversion, conversion of state or polarization, etc. By the term "absorption" is meant the absorption of incident photons and subsequent re-emission of a substantially smaller number or essentially none, the energy being converted to some other form typically kinetic energy of the atoms, etc. This definition is intended to include, for example, wavelength dependent absorption coefficients such as are involved in colored images. The images formed may constitute differences in scattering properties, differences in absorption properties or combinations thereof. Hence, it should be understood that the present invention may be used with virtually all types of images formed in any suitable imaging material.

BRIEF DESCRIPTION OF THE DRAWINGS

For a better understanding of the invention as well as other objects and further features thereof reference is made to the following detailed description of various preferred embodiments thereof, taken in conjunction with the accompanying drawings wherein:

FIG. 1 is a partially schematic, cross-sectional view of an embodiment of an imaging member according to the invention;

FIG. 2 illustrates the operation of each rectangular block provided in the front surface reflection rejection layer provided in accordance with the present invention.

FIG. 3 is a partially schematic isometric view of one embodiment of the reflection rejection layer.

FIG. 4 is a partially schematic isometric view of one another embodiment of the reflection rejection layer.

DESCRIPTION OF THE PREFERRED EMBODIMENTS

Referring now to FIG. 1 there is seen in partially schematic, cross-sectional view an electrooptic imaging member, generally designated 10, wherein a reflection rejection layer 11 and a substantially transparent conductive layer 14 comprise a substantially transparent electrode. Adjacent this electrode is a layer 16 of imaging material which is also adjacent optional photoconductive reflective layer 18. The imaging member also includes a second substantially transparent electrode comprising substantially transparent substrate 20 and a substantially transparent conductive layer 22. It should be noted that in some imaging members, depending upon the scheme of imaging, a reflection rejection layer can be included as the bottom substrate 20 or substituted for the bottom electrode comprising members 20 and 22.

The imaging and display members provided according to the invention are read out in reflection and accordingly imaging member 10 is illustrated as being read out in this mode. Moreover, although in the particularly preferred embodiment shown in FIG. 1 the electrodes are both full frame electrodes it should be recognized that any electrode system capable of providing an imagewise electrical field across imaging layer 16 or erasing an image formed by other means may be utilized as will be described in detail hereinafter.

An imaging member which is to be read out in reflection requires a mirror positioned behind the imaging layer or should include a highly reflecting surface. In the embodiment shown in FIG. 1 the photoconductive reflective layer 18 may provide the light reflecting surface since there are known many photoconductive materials which have a smooth surface when deposited on a flat surface thus giving them relatively high reflectance properties, e.g., from about 10% to about 50%. Alternatively, the bottom electrode may comprise a highly light reflecting material or a dielectric mirror can be employed. The image formed in imaging member 10 is read out with illumination which propagates downwardly from above the member.

In devices substantially the same as that of FIG. 1, except that a transparent electrically insulating substrate is substituted for the front surface reflection rejection layer 12 of the present invention, a number of specular reflections occur. More particularly, there are reflections from each interface traversed by the readout light in passing through the members and reaching the imaging layer-photoconductive layer interface. reflections from the latter interface convey image information corresponding to the image formed in imaging layer 16. Unfortunately, all of these reflections in the prior devices are reflected out of the imaging member in the same direction and, as a consequence, the viewed image suffers greatly by lacking much contrast between image and background.

A method for eliminating the specular reflections caused by the interface between prior substrates and conductive coating 14 and the interface between conductive coating 14 and imaging layer 16 is disclosed in copending patent application U.S. Ser. No. 468,798, filed May 10, 1974.

The practice of the present invention eliminates the contrast reduction due to the reflections from the prior substrate-air interface. In summary, then, the present invention enhances contrast between image and background areas of an image viewed in reflection by redirecting the reflections from the imaging layer photoconductor interface. The result is that the redirected image reflection is in a direction opposite to the direction of surface specular reflection. This is shown in FIG. 1. By combining the methods of the present invention and the aforementioned application, contrast ratios in excess of 200:1 are achievable.

Referring now to FIG. 2 there is seen a single rectangular block from the surface reflection rejection layer. The readout light is incident upon the top surface of the block at an angle $\theta$ and refracted into the block at an angle $\theta'$. The relevant dimensions of the rectangular block are H, for height, and L, for base; these two dimensions are related to each other and to $\theta'$ by the relationship:

$$H = 3/2\ L\ \text{TAN}\ \theta' + 2\ n\ L\ \text{TAN}\ \theta',$$

where $n$ is selected from the group consisting of 0 and positive integers. This relationship is most easily visualized when $\theta'$ is taken as 45°. TAN 45° = 1, and therefor when $n$ is taken as O, H = 3/2 L. Further, for $\theta' = 45°$ and $n = 1$, $H = 7/2$ L; for $n = 2$, $H = 11/2$ L, etc. That is, for $\theta = 45°$, the same effect is achieved when $H = 3/2$ L, 7/2 L, 11/2 L, etc. The value of n is preferably taken to be zero because conservation of materials and other consideration such as overall thickness of imaging member warrant using the thinnest layer possible. However, it is clear that $n$ can also be any positive integer.

Front surface reflection rejection layer 11 can comprise any number of rectangular blocks characterized by the above relationship, including one or more than one rectangular block or, preferably, a virtually continuous layer of many such blocks having a short base dimension, L, and separated by only a couple of wavelengths of readout radiation; for example, one micron separation. From the above relationship among H, L and $\theta'$ it can be seen that for a given value of $\theta'$, the value of H varies directly with the value of L. One single rectangular block can be utilized but the reason why it is not generally preferred is that the base, L, of layer 11 would be as large as the width of the display or imaging member and the height, H, of layer 11 would be even greater.

Therefore, a plurality of rectangular blocks in the front surface reflection layer 11 is preferably utilized in order to keep the height, H, of the rectangular blocks as small as is convenient to the display or imaging member structure or environment (e.g., use in panels, copying machines, etc.).

The rectangular blocks in front surface reflection rejection layer 11 can comprise any suitable transparent material. Typical suitable transparent materials include transparent plastic materials, glass and fiber optics. Typical suitable transparent plastic materials include acrylic plastics, particularly cast sheet polymethacrylates such as ethyl, butyl and methyl methacrylates; polyvinyl plastics such as polyvinyl acetate and polyvinyl butyral resin sheeting; and molded (transparent glass-like) polystyrene. Typical suitable fiber optics materials include fibers of transparent plastics, and glasses, such as lime-aluminoborosilicate glass, soda-lime aluminoborosilicate glass, soda-lime borosilicate glass, soda-titaniazirconium glass, and magnesium aluminosilicate glass. Rectangular fibers can be made of these fiber optic materials by melting marbles of these materials in heated furnaces fitted with square or rectangular extrusion ports or bushings. An air blower beneath the furnace pulls glass from the furnace and through the ports, forming square or rectangular fibers or filaments of the glass materials. The rectangular or square ports will, of course, be selected to have a dimension equal to the base, L, of rectangular block desired so that one of the cross sectional dimensions of the resulting rectangular or square glass fibers is the desired base dimension L. The fibers are then simply cut to have a length H equal to the rectangular block height, H, desired.

Generally speaking, it is not necessary to provide the rectangular blocks with mirrored or reflecting walls in that the angle of incidence of read out radiation $\theta$ can be adjusted for any particular material from which the rectangular block is made so that the readout radiation passing through the surface of and striking the side of the block is totally internally reflected. For example, for a glass-air interface, the critical angle in accordance with Snell's law for total internal reflection is about 42°. That is, the light passing through the glass rectangular block, after striking the surface at an incident angle $\theta$ and refracted to an angle $\theta'$ into the block, is to strike the wall of the glass block at an angle of at least about 42°. Since total internal reflection occurs when passing from a dense to a light medium, an air space is provided between each of the rectangular blocks when the total internal reflection mode is to be utilized. FIG. 3 depicts a regular array where total reflection is used. The air space or gap need only be a couple lengths of the radiations utilized as readout radiation and for practical purposes a spacing of about one micron is adequate. Larger spacings can be utilized but preferably the minimum spacing is utilized to permit a greater number of rectangular blocks to be utilized.

Referring again to FIG. 2, there is seen a transparent rectangular block 13 having a height H and a face dimension L. Incident radiation strikes the top surface of transparent rectangular block 13 at an angle $\theta$ and is divided into two light beams, one beam being specularly reflected as shown in FIG. 2 and the second beam being refracted into transparent rectangular block 13 at an angle $\theta'$ with respect to the normal to the top surface of rectangular block 13 at the point of incidence as shown in FIG. 2. This refracted beam is then reflected at wall A of transparent rectangular block 13 and is refracted through transparent conductive coating 14, passes through imaging layer 16 and reflects from the reflective layer 18 (e.g., a mirror, a reflective metallic coating, or a reflective photoconductor). The beam reflecting from the reflective layer 18 is specularly reflected wherein the angle of reflection is equal to the angle of incidence at the interface between imaging layer 16 and reflecting layer 18 and is refracted back through transparent conductive coating 14, entering transparent rectangular block 13 again reflecting from wall A of block 13 and being refracted out of the top surface of block 13 emerging as a signal conveying image information and is directed substantially parallel to the incident beam but heading in the opposite direction.

Generally speaking, as a practical matter, the base dimension of the transparent rectangular block 13, L, is much larger than the thickness of the imaging layer 16 so that virtually all of the readout light incident upon the top surface of rectangular block 13 which is refracted into block 13 is, upon reflection from reflective layer 18, redirected back through the very same rectangular block 13. Some of the incident readout radiation which is incident upon any one transparent rectangular block 13 at the very edge of the top surface thereof may emerge, upon reflection from layer 18, outside of the very same rectangular block 13. In embodiments of the present invention where front surface reflection rejection layer 11 is comprised of a plurality of blocks 13 adjacent to one another and separated only by a few microns of air as in FIG. 3 or by reflecting material as in FIG. 4, as mentioned above, such light light redirected outside of the very same block 13 typically passes through the adjacent transparent rectangular block 13 and emerges therefrom in substantially the same direction and at substantially the same angle that it would have had it emerged from the very same block 13. Accordingly, the noted effect for radiation passing at the very edges of a particular block 13 is of no detrimental consequence to the viewed image.

In the embodiment illustrated in FIG. 1 front surface reflection rejection layer 11 may comprise any suitable substantially transparent material such as, for example, glass or clear plastic materials. Transparent conductive layer 14 may comprise any suitable conductive material which is at least substantially transparent to the readout illumination. Typical suitable transparent conductive layers include continuously conductive coatings of conductors such as indium, tin oxide, thin layers of tin, aluminum, chromium or other suitable conductors. These substantially transparent conductive coatings are typically evaporated or sputtered onto the more insulating transparent support material.

The bottom electrode may comrpise any suitable material and may be opaque or transparent. Where a substantially transparent electrode is employed support layer 20 and conductive layer 22 can be any of the materials described above. NESA glass, a tin oxide coated glass manufactured by the Pittsburgh Plate Glass Company, is a commercially available example of a typical transparent conductive layer coated over a transparent substrate.

Imaging layer 16 may comprise any of many different imaging materials. Generally, imaging layer 16 may comprise any material wherein there can be formed an image which comprises differences in the light scattering and/or light absorbing properties of the material. Various liquid crystalline materials may be used in layer 16 including any optically negative liquid crystalline materials or compositions, nematic liquid crystalline materials including the structural arrangement commonly referred to as "twisted nematics" and smectic liquid crystalline materials. It should be noted that optically negative liquid crystalline materials or compositions include, for example, cholesteric liquid crystalline materials, mixtures of cholesteric and nematic liquid crystalline materials, mixtures of cholesteric and smectic liquid crystalline materials, mixtures of nematic liquid crystalline material and suitable optically active non-mesomorphic materials, mixtures of cholesteric liquid crystalline materials and suitable optically active non-mesomorphic materials, etc. Typical liquid crystal imaging systems which are capable of forming images with the desired characteristics and which therefore may be utilized in the advantageous system of the present invention include, for example, texture transformations in optically negative liquid crystalline materials such as from the Grandjean to the focal-conic (see, for example, U.S. Pat. No. 3,642,348) or from the focal-conic to the Grandjean (see, for example U.S. Pat. 3,680,950), the optically negative to optically positive phase transition in optically negative liquid crystalline materials which are initially in a light scattering condition (see, for example, U.S. Pat. No. 3,652,148); texture transformations in smectic liquid crystalline materials; dynamic scattering in nematic liquid crystalline materials, dynamic scattering in nematic liquid crystalline materials initially in the homogeneous texture; dynamic scattering in initially homeotropically aligned nematic liquid crystalline materials including those where the homeotropic alignment is caused by surface treatment with materials such as lecithin applied to the surface of a substrate upon which a layer of nematic liquid crystalline material is applied (see, for example, U.S. Pat. No. 3,597,043) and those where the homeotropic alignment is fostered by additives which cause the composition to adopt the homeotropically aligned state when a thin film of composition is deposited on a substrate (see, for example, U.S. Pat. No. 3,803,050); electric field effects in the structural arrangement known as twisted nematics (see Applied Phys. Letters, Vol. 18, No. 4, Feb. 15, 1971, pp. 126–128), etc.

It should be noted here that although in many of the preferred embodiments of the invention the images are formed by applying an imagewise electrical field across the imaging layer, images which exhibit the desired characteristic may be formed by the application of other stimuli to the imaging layer. Therefore, it should be recognized that the advantageous technique for minimizing loss of image contrast when an imaged member is read out is essentially independent of how the image has been created. For example, an imaging member comprising a layer of an optically negative liquid crystalline material initially provided in the Grandjean (clear) texture state may be thermally imaged by imagewise applying thermal energy such as from a laser so as to heat image portions of the imaging layer above the isotropic temperature of the material and then allowed to cool to some temperature in the mesomorphic temperature range of the material whereby the image areas typically assume the focal-conic (light-scattering) textures (see, for example, U.S. Pat. Nos. 3,666,947 and 3,666,948). The image may then be erased by applying an electrical field to place the imaging layer uniformly in the Grandjean texture state. Imaging may also be effected through the use of various other stimuli such as, for example, shear, electromagnetic radiation and magnetic fields as is known in the liquid crystal art.

Imaging layer 16 may comprise an electrophoretic suspension comprising imaging particles in an electrically insulating liquid which may be a different color than the particles. Such imaging layers could be used, for example, in an embodiment wherein a photoconductive layer is present in a display device or in a display device which includes an electrical X-Y matrix address system. Photoelectrophoretic imaging suspensions comprising electrically photosensitive pigment particles in an electrically insulating liquid may be used in layer 16 (see, for example, U.S. Pat. No. 3,607,256). Another type of photoelectrophoretic imaging suspension comprises electrically photosensitive pigment particles and inert particles in an electrically insulating liquid (see, for example, U.S. Pat. No. 3,772,013). Where imaging layer 16 comprises a photoelectrophoretic imaging suspension typically the device is exposed to imagewise activating electromagnetic radiation to which the photosensitive particles are responsive and hence a photoconductive layer is not required. The electrically photosensitive particles may be the same or different colors and the electrically insulating liquid may be a different color than some or all of the imaging particles. Hence, monochromatic or polychromatic images may be formed and the images may be on a clear background or on a differently colored background, etc. Another imaging system which may be used to form images which may be used in the present imaging system is described in copending application Ser. No. 290,618, filed Sept. 20, 1972 now issued as U.S. Pat. No. 3,850,627 which is hereby incorporated by reference herein. The imaging system described in Ser. No. 290,618 can employ an imaging member such as is illustrated in FIG. 1 wherein the photoconductive layer has a thickness of up to about 5 microns and the imaging material comprises a suspension of finely divided particles in an electrically insulating liquid. In operation an electrical field is applied across the imaging layer and the photoconductive layer is exposed to an imagewise pattern of activating electromagnetic radiation.

Imaging layer 16 may comprise a ferroelectric material, electroluminescent material, electrochemical material or an electrofluorescent dye solution such as is disclosed in IEEE Transactions on Electron Devices, Vol. ED-20, No. 11, November, 1973, pp. 1028–32. The thickness of layer 16 is dependent, inter alia, on the type of material which forms the layer. Generally, layer 16 has a thickness in the range of from about 0.5 micron to about 100 microns or more. In a preferred embodiment of the invention wherein the imaging layer comprises optically negative liquid crystalline material and images are formed by the texture transformation system as is described in U.S. Pat. No. 3,642,348, the imaging layer is optimally about 10 microns in thickness. Many materials of the types useful in imaging layer 16 are known in the art and a broad variety of these materials are listed in the patents and articles referenced above. Accordingly, any extensive discussion of materials is not required here.

Any reflecting material can be used for reflecting layer 18. Typical suitable materials include mirrors, metals such as aluminum, indium, and others mentioned as suitable for transparent conductive coating 14 except that the thickness of layer 18 is sufficient for reflection of light.

Any typical suitable photoconductive insulating material may be used for layer 18. Typical suitable photoconductive insulating materials include, for example, selenium, cadmium sulfide, cadmium selenide, and tellurium.

The thickness of the photoconductive layer 18 is typically in the range from about 0.1 microns to about 200 microns or more; the thickness of the layer in any particular instance depends, inter alia, largely upon the spatial frequency of the information to be recorded and upon the sensitivity to the imaging radiation. Photconductive layer 18 may be formed on conductive layer 22 by any of the many methods which are well known to those skilled in the art including, for example, vacuum evaporation, dip coating from a solution, etc.

In operation of the imaging member 10 an electrical field is established across imaging layer 16 and photoconductive layer 18 by means of voltage applied from power source 21 to opposite ends of which are connected conductive layers 14 and 22 and the member is exposed to an imagewise pattern of activating radiation 30 to which the photoconductive material which comprises layer 18 is sensitive thereby forming an image having the above-described characteristics. The imagewise pattern thus created across imaging layer 16 may form an image therein comprising clear transparent areas and light scattering areas. It should be noted here that imaging layer 16 may initially uniformly appear clear and transparent in which case light scattering image areas may be created; or the layer may initially uniformly appear light scattering and clear transparent image areas may be created. Thus, it is apparent that the images formed in layer 16 may comprise clear, transparent image areas on a light scattering background or light scattering image areas on a clear transparent background. Moreover, the images may be of one color on a differently colored background. Power source 21 may be A.C., D.C. or combinations thereof. The image formed in imaging member 10 may be read out with ambient light or a separate readout light source (not shown) may be provided.

A spacer member is typically used in liquid crystalline imaging members to separate the electrodes and contain the imaging layer between the electrodes. The spacer is typically chemically inert and substantially insulating. Materials suitable for use as insulating spacers include cellulose acetate, cellulose triacetate, cellulose acetate butyrate, polyurethane elastomers, polyethylene, polypropylene, polyesters, polystyrene, polycarbonates, polyvinylfluoride, polytetrafluoroethylene, polyethylene terephthalate and mixtures thereof.

A preferred method of making front surface reflection rejection layer 11 comprises first forming a coherent bundle of optical fibers and epoxying the fibers into a rigid bundle with transparent epoxy resins or with other typically suitable transparent optical glue well known to those known skilled in the art. The rigid bundle of fibers is then sawed into a slab of thickness, H, equal to the desired height, H, of the individual transparent rectangular blocks within front surface reflection rejection layer 11. This method is preferred for convenience and ease of fabrication reasons. As previously mentioned, total internal reflection can be used for reflection viewing in this embodiment since the individual blocks are not covered with reflecting material.

In those instances where reflection viewing is preferably conducted without depending upon total internal reflection, the individual optical fibers are first coated with the reflective material prior to forming a bundle and prior to gluing the optical fibers into a rigid bundle. After sawing a slab of the resulting rigid bundle at a thickness, H, the resulting front surface reflection rejection layer having individual rectangular blocks coated with reflecting material appears as shown in FIG. 4. In FIG. 4, each of the individual rectangular blocks 13 is covered on four sides with reflective coating material 40.

In embodiments where air-gaps are desired between each of the individual rectangular blocks 13, as shown in FIG. 3, each individual block 13 is individually caused to be adhered to transparent conductive coating 14.

While we have spoken primarily with respect to the preferred embodiments of utilizing fiber optics in front surface reflection rejection layer 11 and utilizing layer 11 in a preferred imaging member additionally comprising a liquid crystalline imaging layer, a photoconductive reflecting layer, sandwiched between two electrodes, it will be understood by those skilled in the art that the invention is as broad as any imaging member in which the member is to be viewed in reflection. The invention is not intended to be limited to the aforementioned embodiments but rather those skilled in the art will recognize that variations and modifications may be made therein which are within the spirit and the scope of the claims.

What is claimed is:
1. A reflection viewing system, comprising:
 a. an imaging member comprising a layer of material capable of undergoing a change in light scattering or light absorption properties in imagewise configuration and, on one side of said layer of material, a planar reflecting layer;
 b. illumination means for directing radiation upon said imaging member at an angle of incidence, $\theta$ and located on the other side of said layer of material; and
 c. in contact with said imaging member on said other side of said layer of material, a reflection rejection layer comprising at least one transparent block in rectangular configuration and having the dimensions of height H, and base L, characterized by the relationship $H = 3/2L \tan \theta' + 2nL \tan \theta'$, wherein $n$ is selected from the group consisting of O and positive integers and wherein $\theta'$ is the refraction angle of light into said transparent block for an incidence angle of light upon said transparent block of $\theta$.

2. The viewing system as claimed in claim 1 wherein said transparent rectangular block comprises glass.

3. The viewing system as claimed in claim 2 wherein said front surface reflection rejection layer comprises a plurality of such rectangular blocks.

4. The viewing system as claimed in claim 1 wherein said rectangular block comprises plastic.

5. The viewing system as claimed in claim 4 wherein said front surface reflection rejection layer comprises a plurality of such rectangular blocks.

6. The viewing system as claimed in claim 1 wherein said rectangular block is provided with a coating of reflective material on the walls of said block having the dimension H.

7. The viewing system as claimed in claim 6 wherein said front surface reflection rejection layer comprises a plurality of such rectangular blocks.

8. The viewing system as claimed in claim 1 wherein said front surface reflection rejection layer comprises a plurality of such rectangular blocks.

9. The viewing system as claimed in claim 1 wherein said imaging layer comprises a suspension of imaging particles in an electrically insulating liquid.

10. The viewing system as claimed in claim 9 wherein said liquid has a different color than at least some of said imaging particles.

11. The viewing system as defined in claim 1 wherein said imaging layer has a thickness in the range of from about 0.5 to about 100 microns.

12. The viewing system as defined in claim 1 wherein said imaging layer comprises liquid crystalline material.

13. The viewing system as claimed in claim 12 wherein said imaging material comprises smectic liquid crystalline material.

14. The viewing system as defined in claim 12 wherein said imaging material comprises nematic liquid crystalline material.

15. The viewing system as claimed in claim 12 wherein said imaging material comprises a nematic liquid crystalline material substantially uniformly in the homeotropic texture state.

* * * * *